United States Patent [19]

Ootsuka

[11] Patent Number: 4,947,290

[45] Date of Patent: Aug. 7, 1990

[54] RAIL MOUNTING DEVICE FOR AN ELECTRICAL EQUIPMENT

[75] Inventor: Shigeharu Ootsuka, Aichi, Japan

[73] Assignee: Mitsubishi Denki Kabushiki Kaisha, Tokyo, Japan

[21] Appl. No.: 413,007

[22] Filed: Sep. 26, 1989

[30] Foreign Application Priority Data

Sep. 29, 1988 [JP] Japan ................................ 63-242539

[51] Int. Cl.⁵ .............................................. H05K 7/02
[52] U.S. Cl. .................................. 361/417; 248/222.1; 335/132; 361/331; 361/419; 361/420; 439/716
[58] Field of Search ............... 361/331, 335, 346, 347, 361/348, 353, 376, 380, 417, 419, 420, 426, 427; 439/713, 716; 335/132; 200/293, 294, 307; 248/221.3, 222.1, 222.4

[56] References Cited

U.S. PATENT DOCUMENTS 4,671,697  6/1987  Ando et al. ......................... 403/325
4,698,726  10/1987  Ootsuka et al. ..................... 361/335
4,816,966  3/1989  Frankowski ......................... 361/346

FOREIGN PATENT DOCUMENTS 62-55830   7/1987  Japan .
62-188035  11/1987 Japan .
63-120340  8/1988  Japan .

Primary Examiner—Gregory D. Thompson
Attorney, Agent, or Firm—Burns, Doane, Swecker & Mathis

[57] ABSTRACT

A rail mounting device for mounting a rail to electrical equipment includes a case and a resilient movable claw. The case includes a recess into which a rail may fit, and a stationary claw protruding into the recess for holding one edge of the rail. The movable claw is mounted to a side surface of the case such that fitting protions on the movable claw protrude into the recess to hold the other edge of the rail, and such that the fitting portions are movable to allow easy insertion or removal of the rail into or out of the recess.

7 Claims, 4 Drawing Sheets

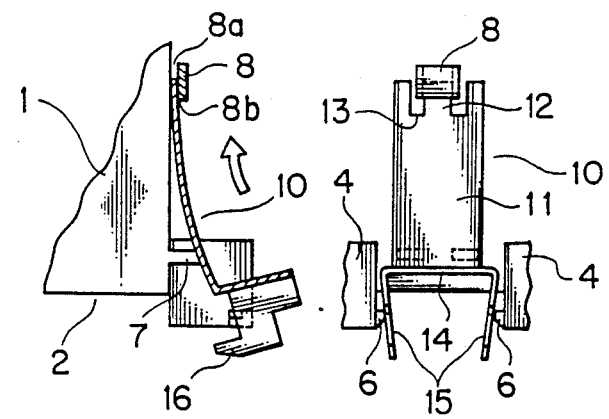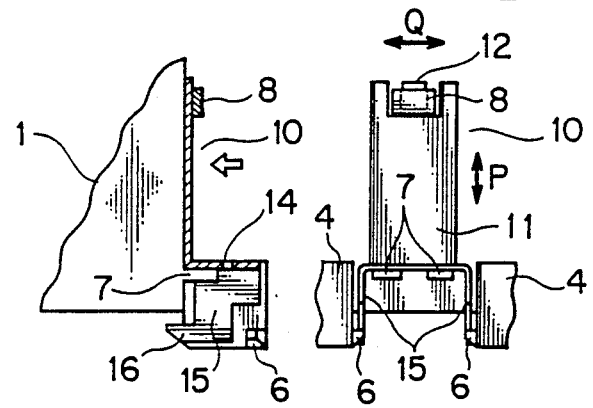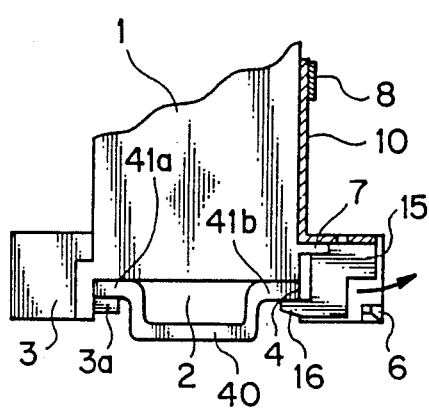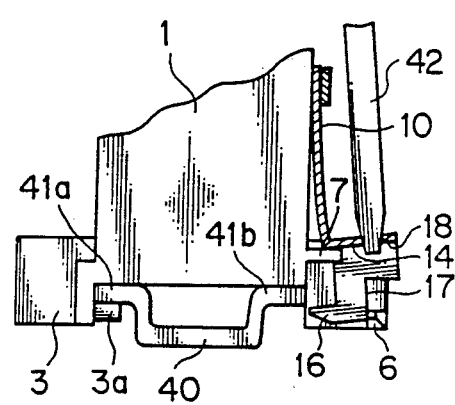

U.S. Patent   Aug. 7, 1990   Sheet 4 of 4   4,947,290
FIG. 9 — PRIOR ART
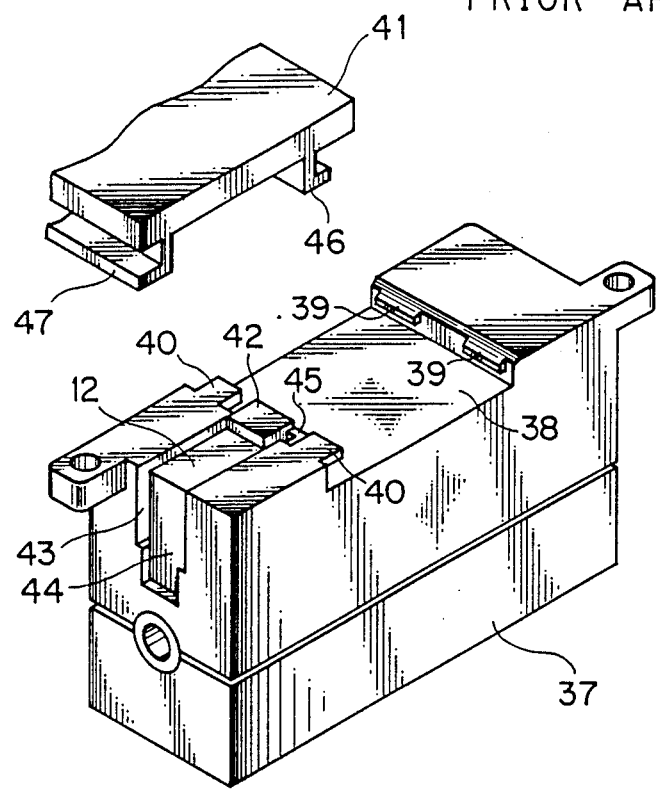
FIG. 10 — PRIOR ART
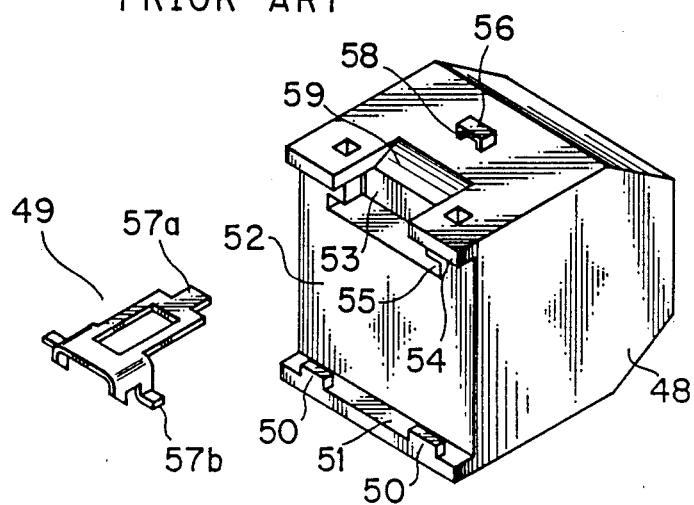

RAIL MOUNTING DEVICE FOR AN ELECTRICAL EQUIPMENT

BACKGROUND OF THE INVENTION

1. Field of the Invention

The present invention relates to a rail mounting device for fitting a rail into an electrical equipment of relatively small type such as an electromagnetic contactor.

FIG. 7 is a front view of a conventional rail mounting device thereby an electrical equipment is mounted on a rail. In FIG. 7, reference numeral 1 designates a case of the electrical equipment, and 2 designates a recess formed in a bottom surface of the case 1 into which a rail 40 is fitted. A holding claw 3a is formed on one of the side walls of the recess 2. In mounting the case 1 on the rail 40, one edge 41b of the rail 40 is first brought into engagement with the holding claw 3a so as the rail 40 to be fitted into the recess 2 and then the other edge 41a thereof is firmly supported by a tip end of a movable claw 30 provided to the case 1.

FIG. 8A is a magnified bottom view of a portion A including the movable claw 30 in FIG. 7, together with the part of the case 1 and recess 2. 21 denotes a sliding groove provided in the bottom surface of the case 1, which is intersecting at right angles with the recess 2. On the bottom surface of the sliding groove 21, there are formed with a pair of receiving shelves 22 facing the recess 2 side so that the opening portion of the sliding groove 21 is gradually expanded in two steps from the recess 2 side toward the opposite side thereof. 23 is a spring receiver protrudedly formed on the bottom surface of the sliding groove 21. The movable claw 30 is formed by molding synthetic resin, and is slidably inserted into the sliding groove 21.

A longitudinal central portion of the movable claw 30 is formed thick and has a width slightly narrower than the interval between the pair of receiving shelves 22. A rail fitting portion 31 is provided on the tip end of the movable claw 30. Sliding guide portions 32 having a thickness fittable into the sliding groove 21 are formed at both sides of central thick portion of the movable claw 30, and stoppers 33 are formed at the rear end thereof. The movable claw 30 has a window hole 34 with a spring seat 35 formed at the front end thereof. Reference numeral 36 designates a coil spring.

For attaching the movable claw 30 to the case 1, the movable claw 30 is inserted into the sliding groove 21 from the side opposite to the recess 2, and at the same time the coil spring 36 is mounted between the spring receiver 23 and the spring seat 35. As a result, the movable claw 30 moves forward in the sliding groove 21 urged by the coil spring 36, and stops when the stoppers 33 abut against a side surface of the case 1. At this time, the rail fitting portion 31 protrudes into the recess 2 as shown in FIG. 8C to hold the rail 40.

In removing the case 1 from the rail 40, when the movable claw 30 is pulled in a direction opposite to the recess 2, the rail fitting portion 31 is disengaged from the edge portion 41a of the rail 40, and thus, it is possible to readily remove the case 1 from the rail 40. In order to prevent the movable claw 30 from slipping out of the receiving shelves 22 when the movable claw 30 is pulled, the coil spring 36 prevents further movement thereof.

Furthermore, other conventional rail mounting devices of this type are disclosed in Japanese Utility Model Laid-Open Publication Nos. 62-55830 and 62-188035. The electrical equipment with a rail mounting mechanism disclosed in Japanese Utility Model Laid-Open Publication No. 62-55830 includes, as shown in FIG. 9, an electrical equipment main body 37 comprising a recess 38 formed in a bottom surface thereof having respective pairs of first and second holding portions (39, 40) protruding from both sides of the recess towards the center portion thereof for holding a rail 41 to be fitted thereinto, and a holding piece 42 having resiliency and an L-shaped cross section mounted on a stepped portion 43 formed in the bottom to side surfaces of the main body 37, the base portion 44 of the holding piece 42 being joined to the side surface of the electrical equipment main body, while the opposite tip end 45 thereof having a U-shape.

For mounting the electrical equipment on a rail by use of this mounting mechanism, first fit the second pair of holding portions 40 and the tip end 45 of the holding piece 42 to a leg portion 47 of the rail 41, and then the electrical equipment main body 37 is urged by the rail in the direction of the holding piece 42 to turn the holding piece slightly about the base portion 43 thereof. Then, after the other leg portion 47 of the rail 41 has been engaged with the first holding portions 39, the holding piece 42 is returned to its original position by its own resiliency, and the rail 41 is attached by fitting the U-shaped portion 45 of the holding piece to the leg portion 47 of the rail 41.

On the other hand, the rail mounting device for an electrical appliance disclosed in Japanese Utility Model Laid-Open Publication No. 62-188035 includes a case 48 made of synthetic resin and a movable claw 49. The case comprises a stationary claw 50 provided on a first side wall 51 of a bottom recess 52 and engageable with one side edge of a rail (not shown), a guide notch 53 formed in the second side wall 54 facing to the first wall 51 of the bottom recess 52, a holding dent portion 55 formed in a bottom surface of the bottom recess 52 near the second side wall 54 in parallel with the side walls and having a width wider than the guide notch 53, and a holding projection 56 for holding the movable claw 49, which is provided on an outer wall of the case at the near side of the guide notch 53. The movable claw 49 comprises a tongue 57b engageable with the holding projection 56, an engaging arm 57a to be engaged with the holding dent 55 and inserted into the guide notch 53 in such a manner as to move forward and backward, and a holding claw 49 engageable with the other edge of the rail.

In mounting the case on the rail, the tongue 57a of the movable claw 49 is inserted into a square hole 58 of the holding projection 56, and a resilient piece 57 is bent along a slant surface 59 of the guide notch 53 and pushed upwardly to fit the engaging arm 57b into the holding dent portion 55. Then, the stationary claw 50 of the case is brought into engagement with one side edge of the rail, and the movable claw 49 is pushed towards the other side edge of the rail while turning the case 48 about the engaging point so that the case is mounted on the rail.

In the conventional mounting device shown in FIGS. 7 and 8A to 8C, the assembling operation is troublesome, many man-hours are required, and the cost is high because of the adoption of the movable claw 30 and coil spring 36. Furthermore, various problems have been involved in that the case 1 supports the movable claw 30 in the vertical direction only by the slant portions of the receiving shelves 22 as shown in FIG. 8C, whereby the space and length of the slant portions are insufficient for supporting the movable claw 30, and thus the claw 30 is apt to be removed. Moreover, since the slide guide portion 32 is made sufficiently thin so as to be inserted into the slide groove 21, and since the receiving shelves 22 are also made thin in order to keep the product small in size, these parts are tend to be broken easily. In addition, since the slipping off of the movable claw 30 is prevented by utilizing the compression of the coil spring 36, there is difficulty in construction thereof, and the prevention of the slipping phenomenon can not be secured.

In the device disclosed in Japanese Utility Model Laid-Open Publication No. 62-55830, a problem is involved in that since the first and second holding portions are protruded at both sides of the recess, it is not clear how the rail having a width wider than the width between both the holding portions is fitted into the recess to be held thereby. Further, even though the electrical equipments were mounted on the rail, since there is a large play between the rail and the side walls of the recess, it would be difficult to securely mount the electrical equipment on the rail, and the equipment would tend to be out of place due to vibrations, impulses and so on.

Furthermore, in the device disclosed in Japanese Utility Model Laid-Open Publication No. 62-188035, there is a problem in that since the guide notch and the dent portion are formed in the side surface of the case, the structure becomes complicated. Moreover, since a screw driver or the like has to be inserted obliquely to reach the movable claw, a large square window is necessary, and thus the mechanical strength becomes weak and the handling is inconvenient. Furthermore since no measure is provided to prevent the movable claw from slipping out of place towards the rail when the movable claw is accommodated in the case, it tends to be removed in a state that the electrical equipment is not mounted on the rail. In addition, since the sliding movement of the movable claw in the holding dent portion of the case is performed with a cut-out surface of the engaging arm of the movable claw, the movable claw is apt to be stuck in the midway of the sliding movement. Further, since the sectional area of the engaging arm of the movable claw is small, the mechanical strength is weak and tends to be deformed.

SUMMARY OF THE INVENTION

The present invention was made to solve the above mentioned problems, and it is an object of the present invention to provide a rail mounting device for an electrical equipment, which is of a simple construction, and secure mounting of the electrical equipment to a rail without affecting the strength of a movable claw as a whole.

A rail mounting device for an electrical equipment according to the present invention comprises a case and a movable claw made of a resilient material. The case includes a recess formed in a bottom surface of the case for fitting a rail thereinto, a stationary claw protruding from one of the side walls of the recess towards the other side wall thereof, a pair of protruding portions formed on both sides of a side surface of the case and integrally extending from the other side wall of the recess, the side surface intersecting the recess at right angles, a pair of draw-out preventing projections projecting inwardly from opposing surfaces of the pair of protruding portions, a receiving shelf provided on the side surface of the case between the pair of protruding portions, and an engaging projection formed on the side surface and having a through hole. The movable claw includes an abutting portion having a tongue at one end thereof, the tongue being inserted into the through hole of the engaging projection, a receiving piece portion having a U-shape which is formed by bending the other end of the abutting upwardly at right angles, the receiving piece having leg pieces at both lateral ends thereof also bent in such a manner as to extend in a direction opposite to the abutting portion with an interval of the leg pieces substantially equal to a distance between the opposing surfaces of the pair of protruding portions on the side surface of the case, and fitting portions respectively formed at tip ends of the leg pieces of the receiving piece portion.

In attaching the movable claw to the case, the tongue of the movable claw is inserted into the hole of the engaging projection of the case to place the base portion of the movable claw on the receiving shelf, and the movable claw is pushed to further insert the tongue while deflecting the movable claw upwardly so as to fit the movable claw between the engaging projection and the receiving shelf. The movable claw is thus attached to the case.

Then, in mounting the case on the rail, the stationary claw of the case is fitted to one edge of the rail, and when an end of the case opposite to the stationary claw is pushed down towards the rail, the movable claw is deflected and the fitting portions escape outwardly to permit the rail to be fitted into the recess. When the rail is fitted into the recess, the movable claw returns to its original state by its own resiliency and thus other edges of the rail is fitted into the fitting portions.

BRIEF DESCRIPTION OF THE DRAWINGS

FIGS. 3A and 3B, and 4A and 4B illustrate mounting of the movable claw of the invention to the case, wherein FIGS. 3A and 4A are longitudinal sectional views, while FIGS. 3B and 4B are front views;

FIGS. 5 and 6 illustrate mounting and demounting of the case in the present invention to and from a rail respectively;

FIG. 9 is a perspective view of a conventional rail mounting device according to the Japanese Utility Model Laid-Open Publication No. 62-55830.

FIG. 10 is a perspective view of a conventional rail mounting device according to the Japanese Utility Model Laid-Open Publication No. 62-188035.

DETAILED DESCRIPTION OF THE PREFERRED EMBODIMENT

There will now be described a preferred embodiment of the present invention with reference to the drawings.

Figure 1:
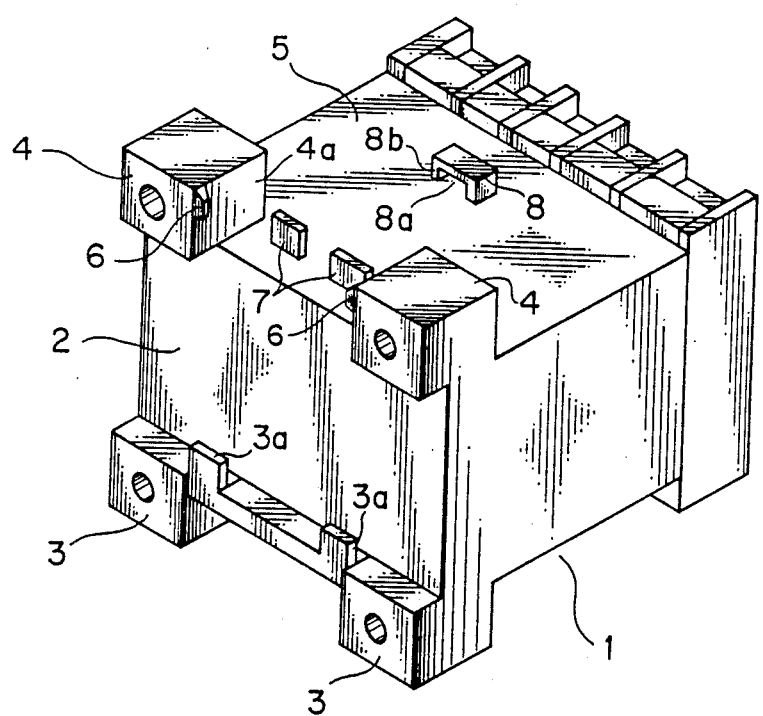
FIG. 1 is a perspective view of a preferred embodiment of the case according to the present invention.

Referring to FIG. 1, reference numeral 1 designates a case of an electrical equipment whose bottom surface is formed with a recess 2 for fitting a rail thereinto. Two pairs of legs 3, 3 and 4, 4 for fixing screws are respectively provided on both sides of the recess 2, and these two pairs of legs also constitute side walls thereof. Reference numeral 3a are stationary claws provided between one pair of legs 3 in such a manner as to protrude towards the recess 2, and are engageable with one edge of a rail (not shown). Draw-out preventing projections 6, 6 are formed to project inwardly from opposing inner walls of the other pair of legs 4, and these projections 6 prevent a movable claw 10 (FIG. 2) from being drawn out of position.

In this case, when the two pairs of legs 3 and 4 are not required for screw fixing operation, it is also possible to arrange in such a way that the stationary claws 3a are formed by utilizing one side wall of the recess 2, and a central portion of the other side wall thereof is cut away so that two protruding portions (similar to the legs 4, 4) can be formed at both sides of the side surface 5 intersecting the recess 2 at right angles, which are integrally extending from the corresponding wall of the recess 2. The draw-out preventing projections 6, 6 are formed on opposing inner walls of the protruding portions respectively.

The case side surface 5 intersects the recess 2 at right angles, and receiving shelves 7, 7 are provided on the side surface 5 between the pair of legs 4, 4 for supporting the movable claw 10. An engaging projection 8 is provided on the side surface 5 spaced from the receiving shelves 7 towards the top of the case 1, which projection 8 is formed with a square hole 8a along the side surface 5 and also with a stopper surface 8b which faces the receiving shelves 7.

Figure 2:
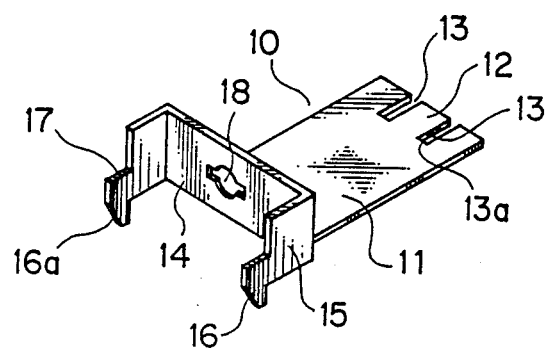
FIG. 2 is a perspective view of a preferred embodiment of the movable claw according to the present invention.
Figure 7:
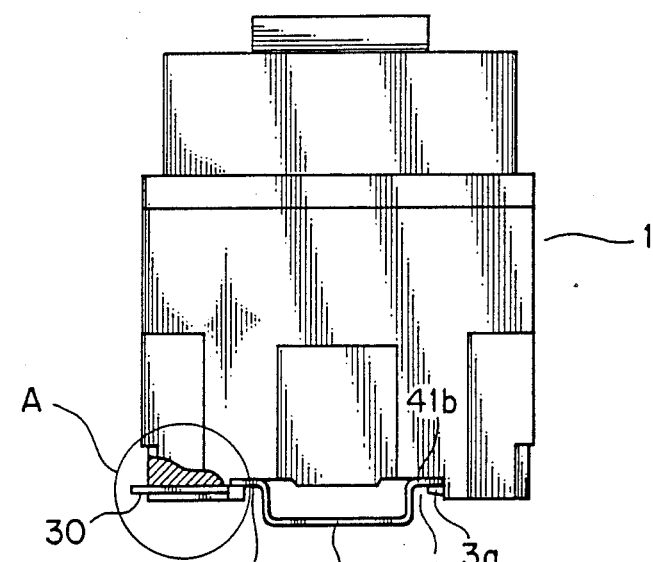
FIG. 7 is a front view of a conventional rail mounting device.
Figure 8A:
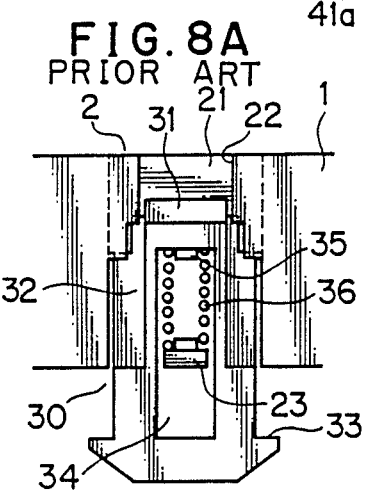
FIGS. 8A, 8B and 8C are explanatory views illustrating the function of the rail mounting device of FIG. 7.
Figure 8C:
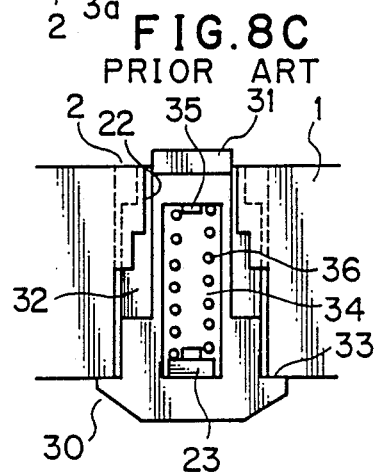
Figure 8B:
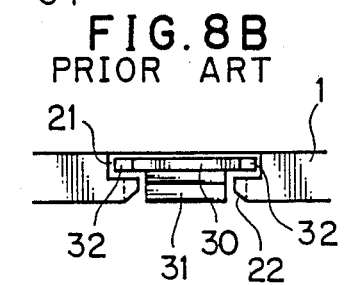

Referring to FIG. 2, reference numeral 10 designates the movable claw made of a resilient metallic plate bent in an L-shape and includes an abutting portion 11. A tongue 12 is formed at a tip end of the abutting portion 11 by cutting two slits 13, 13 to be inserted into the square hole 8a of the engaging projection 8 of the case 1. A bottom surface 13a of each slit 13 abuts against the stopper surface 8b of the engaging projection 8 when the tongue 12 is fully inserted into the square hole 8a. A receiving piece portion 14 is formed by bending a base portion of the abutting portion 11 upwardly at right angles, and the receiving piece portion 14 has side leg pieces 15, 15 at lateral ends thereof formed by bending the lateral ends of the receiving piece portion 14 at right angles in a direction opposite to the abutting portion 11. Thus, the receiving piece portion 14 together with the side leg pieces 15 is formed in an inverted U-shape. Each of the leg pieces 15 has a fitting portion 16 formed at a lower tip end, so that it engages and holds the other edge of the rail. Furthermore, the fitting portion 16 has a slant surface 16a at a tip end thereof, and an abutting surface 17 formed at the front portion of the tip end, which faces corresponding one of the draw-out preventing projections 6 of the case 1. The receiving piece portion 14 is formed with a hole 18 for inserting a screw driver or the like when the case 1 is removed from the rail.

The attaching operation of the movable claw 10 to the case 1 will be described with reference to FIGS. 3A, 3B and 4A, 4B. The tongue 12 of the movable claw 10 is inserted into the square hole 8a of the engaging projection 8 so that both side walls of the square hole 8a are respectively inserted in the slits 13, and the base portion of the movable claw 10 is placed on the receiving shelves 7. The movable claw 10 is further pushed in a direction of the arrow while deflecting the abutting portion 11 upwardly (FIG. 3A). At this time, the leg pieces 15 of the movable claw 10 are deflected inwardly (FIG. 3B) along the slant surfaces formed on the draw-out preventing projections 6, and the movable claw 10 is inserted between the legs 4 of the case 1. When the movable claw 10 is further pushed in the direction of the arrow shown in FIG. 3A to the extent that bottom surfaces 13a of the slits 13 abut against the stopper surface 8b of the engaging projection 8, the deflection of the abutting portion 11 and the leg pieces 15 of the movable claw 10 is restored. Since this deflection is within the range of elastic deformation, the movable claw 10 is not deformed and it is fitted between the engaging projection 8 and the receiving shelves 7 tightly. Specifically, as shown in FIGS. 4A and 4B, the shift of the position of the movable claw 10 in directions P (vertical) is restricted by the engaging projection 8 (stopper surface 8b) and the receiving shelves 7 (upper surfaces) with respect to the positions of the abutting surfaces 13a and the rear surface of the receiving piece portion 14. The shift of the position of the movable claw 10 in direction Q (lateral) is restricted by the inner walls 4a of the legs 4 with respect to the positions of both the leg pieces 15, since a distance between the leg pieces 15 is generally equal to a distance between the inner walls 4a of the legs 4, as seen in FIG. 4B.

In mounting the rail mounting device structured as described above to a rail, as shown in FIG. 5, the stationary claws 3a are brought into engagement with one edge 41a of the rail 40 so that the edge 41a is fitted between the bottom surface of the recess 2 and the stationary claws 3a. Then, when the side surface 5 side of the case 1, to which the movable claw 10 is attached, is pressed down, the slant surfaces 16a of the fitting portions 16 of the movable claw 10 abut against an end portion of the other edge 41b of the rail 40. Upon pressing down the case 1 further, the movable claw 10 is deflected and turned outwardly in a direction of the arrow about an engagement portion between the engaging projection 8 and the tongue 12 as shown in FIG. 3A. Thus, the fitting portions 16 of the movable claw 10 escape or move away from the edge 41b of the rail 40 and allow the edge 41b to be fitted into the recess 2. As a result, the movable claw 10 restores resiliently and returns to its original state to make the fitting portions 16 engage with the edge 41b of the rail 40. Accordingly, the case 1 is mounted on the rail 40 securely. In this case, since the receiving piece portion 14 of the movable claw 10 is received by the receiving shelves 7 of the case 1, the movable claw 10 is supported and held with sufficient strength.

FIG. 6 illustrates removing operation of the case 1 from the rail 40, which has been mounted on the rail 40 as described above. First, a tip of a screw driver 42 or the like is inserted into the hole 18 formed in the receiving piece portion 14, and the movable claw 10 is turned outwardly in a direction of the arrow so that the fitting portions 16 of the movable claw 10 are moved away from the rail 40. As a result, because of the fitting portions 16 are disengaged from the edge 41b of the rail 40, it is possible to easily demount the case 1 from the rail 40.

At this time, even when the movable claw 10 is turned until the abutting surfaces 17 touch or hit the draw-out preventing projections 6, the movable claw 10 never comes out of the case 1, because the receiving piece portion 14 is lapped over the receiving shelves 7. Furthermore, since the interval between the draw-out preventing projections 6 is formed narrower than a width of the leg pieces 15 of the movable claw 10, the leg pieces 15 never move over the draw-out preventing projections 6. For this reason, when the screw driver 42 inserted into the hole 18 of the receiving piece portion 14 is released, the movable claw 10 returns by its own resiliency to the condition as shown in FIG. 5.

Such movements of the movable claw 10 can be performed smoothly without being caught owing to sliding movements between the receiving piece portion 14 and the receiving shelves 7, and between the inner walls 4a of the legs 4 and the outer surfaces of the leg pieces 15.

ADVATAGES OBTAINED BY THE PRESENT INVENTION

As will be apparent from the above description, in the present invention, a movable claw made of a resilient material is attached to a case of electrical equipment, and the case is mounted on a rail by utilizing the resilient property of the movable claw. As a result, the following significant advantages are provided:

(1) Only few parts are needed, and the assembling and mounting on a rail are easy, and man-hours can be reduced.

(2) Since dimensional relationships between the movable claw and the protruding portions (legs) formed on the case, between the movable claw and the draw-out preventing projections, and between the movable claw and the draw-out preventing projections, and between the movable claw and the receiving shelves and engaging projections are accurately defined, attaching of the movable claw to the case and mounting of the case on the rail can be performed accurately. Furthermore, no slipping out of position of the movable claw or the case occurs after attaching or mounting thereof, and the reliability can be improved.

(3) The sliding portions between the movable claw and the case are formed by surfaces which are in surface contact with each other. Accordingly, in inserting or attaching the movable claw to the case, no catch or constrain and no deformation occur, and smooth movement and sufficient strength can be insured.

(4) The movable claw is formed in an L-shape and a hole for inserting a driver screw or the like for manipulation is formed in parallel with the side surfaces of the case. Accordingly, the insertion and manipulation of the driver screw are easy in removing the case from the rail.

(5) Since the abutting portion of the movable claw is formed by a single plate, the mechanical strength is sufficiently high and no damage or deformation is caused.

What is claimed is;

1. A rail mounting device for mounting a rail to electrical equipment, comprising:

a case of the electrical equipment and a movable claw made of a resilient material;
said case including
a recess formed in a bottom surface of said case for fitting a rail thereinto;
a stationary claw protruding into said recess from a first side of said recess;
a pair of protruding portions formed on a side surface of said case and integrally extending along a second side of said recess;
a pair of projections projecting inwardly from opposing surfaces of said pair of protruding portions;
at least one receiving shelf provided on said side surface of said case between said pair of protruding portions; and
an engaging projection formed on said side surface and having a through hole therethrough;
said movable claw including
an abutting portion having a tongue at one end thereof, said tongue being engaged with said engaging projection;
a receiving piece portion having an inverted U-shape which is formed by bending the other end of said abutting portion upwardly at a right angle to said one end of said abutting portion, said receiving piece portion having leg pieces at both lateral ends thereof bent such that a distance between said leg pieces is generally equal to a distance between said opposing surfaces of said pair of protruding portions on said side surface; and
fitting portions respectively formed at tip ends of said leg pieces of said receiving piece portion.

2. A rail mounting device for mounting a rail to electrical equipment as claimed in claim 1, wherein said fitting portions are adapted to engage an edge of a rail fitted into said recess.

3. A rail mounting device for mounting a rail to electrical equipment as claimed in claim 1, wherein each of said fitting portions includes a slant surface at its tip end, said slant surface adapted to allow said fitting portions to be moved out of said recess by an edge of the rail during mounting of the rail.

4. A rail mounting device for mounting a rail to electrical equipment as claimed in claim 1, wherein said receiving piece portion is formed with a hole in a central portion thereof so that a tool may be inserted thereinto to move the movable claw and thereby allow dismounting of the rail from the case.

5. A rail mounting device for mounting a rail to electrical equipment as claimed in claim 1, wherein said movable claw can be deformed to the extent that said fitting portions are moved out of said recess, said receiving piece portion and said projections projecting inwardly from said protruding portions being thereby mutually engaged.

6. A rail mounting device for mounting a rail to electrical equipment as claimed in claim 1, wherein external surfaces of said leg pieces abut respective surfaces of said projections when said movable claw is deformed.

7. A rail mounting device for mounting a rail to electrical equipment as claimed in claim 1, wherein said at least one receiving shelf supports said movable claw.

* * * * *